United States Patent
Shi et al.

(10) Patent No.: US 6,430,070 B1
(45) Date of Patent: Aug. 6, 2002

(54) SYNCHRONOUS PWM SWITCHING REGULATOR SYSTEM

(75) Inventors: Bingxue Shi; Lu Chen; Chun Lu, all of Beijing (CN)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/863,917

(22) Filed: May 23, 2001

(51) Int. Cl.[7] .............................. H02M 5/42; G05F 1/40
(52) U.S. Cl. ........................ 363/97; 323/282; 323/271
(58) Field of Search ............................. 363/21.05, 53, 363/125, 127, 131, 97, 98; 323/280, 281, 282, 284, 285, 271, 272

(56) References Cited

U.S. PATENT DOCUMENTS 5,610,503 A * 3/1997 Fogg et al. ................. 323/283
5,892,672 A * 4/1999 Preller ........................ 363/97
6,204,648 B1 * 3/2001 Saeki et al. ................. 323/282

* cited by examiner

Primary Examiner—Rajnikant B. Patel
(74) Attorney, Agent, or Firm—J.C. Patents

(57) ABSTRACT

A synchronous pulse width modulation (PWM) switching regulator that is suitable for high-performance CPUs. A DAC converts a plurality of inputted digital signal into analog signal that indicates the desired voltage. A circuit creates the necessary PWM signal to control a pair of drivers and their associated switches to convert a first inputted voltage to a second desired voltage. A soft-start circuit ensures that the startup voltage does not overshoot an expected level. Over-current and over-voltage protection circuits ensure that the circuit will not damage any circuits that power is supplied to.

5 Claims, 6 Drawing Sheets

SYNCHRONOUS PWM SWITCHING REGULATOR SYSTEM

FIELD OF THE INVENTION

The present invention relates to a DC/DC converter, in particular, to a converter with an adjustable output that utilizes synchronous pulse-width modulated switching with over-current, over-voltage, and soft-start functions.

BACKGROUND OF INVENTION

As portable electronic devices become more popular, there is a strong need for more efficient uses of limited energy sources such as batteries. This requirement has led to electronic devices to operate with lower voltage levels. For example many modern microprocessors only require between 1.3 v–3.5 v to operate. As many of circuits have a higher inputted voltage level, a DC-DC converter that alters a first input voltage to a second lower output voltage is required. DC-DC converters typically fall into two categories; linear regulators, and switching regulators. Of the two, switching regulators are the preferred devices for applications where energy sources are limited, due to their operating efficiency wherein efficiency is output energy over input energy. Switching regulators operate by passing energy in discrete packets over a low resistance switch. Types of switching regulators are usually defined by the methods in which their switches are controlled. The main methods include pulse-frequency modulation PFM where the switch is cycled at a 50% duty cycle until the output voltage comes within range, current-limited pulse-frequency modulation where the charge terminates when a predetermined peak inductor current is reached, and pulse-width modulation PWM where the switch frequency is constant and controlled through the duty cycle that varies with the load. In order to obtain maximum efficiency within the circuit, one of the largest power loss factors is the voltage drop across the diode of a switching regulator. To minimize this loss many designs utilize a Schottky-type diodes that have a low forward voltage drop and high speed. However for maximum efficiency MOSFETs can be used in a synchronous rectification design. The low on-resistance of the MOSFETs allows this design to have a minimum voltage drop so that conversion efficiency can be further improved. An example of a synchronous rectification circuit is shown in FIG. 1. A PWM control circuit controls the operation of the transistors as so neither transistor is on at the same time. The upper transistor is connected to a voltage supply that is impressed across the inductor when the upper transistor is on, and the lower transistor is off. Current through the inductor rises linearly with time at a rate that is proportional to the input voltage divided by the inductance. When the upper transistor turns off, the lower transistor turns on, and the voltage across the inductor changes instantaneously to whatever is required to maintain the current flow. A capacitor coupled to the output voltage helps to reduce the voltage ripple from the output.

Typically microprocessors will use linear power supplies which can provide the most noise free, stable supply, however its low conversion efficiency is not suitable for microprocessors in portable applications wherein the power consumption can require in excess of 30 W. Hence the use of switching power supplies for applications with limited power sources is an attractive alternative due to their energy efficiencies. Many switching powers supplies however are not suitable for modern day microprocessors due to their the high ripple in their outputs, poor dynamic response, and noise on the outputs that make them incompatible with manufacturer requirements for power sources for microprocessors. Therefore there is a need for a switching power supply that can adequately meet the power requirements of modem microprocessors.

SUMMARY OF THE INVENTION

It is therefore an object of the present invention to provide a synchronous PWM DC/DC converter circuit where the circuit integrates control, output adjustments, output monitoring and protection functions.

It is also an object of the present invention to provide a DC/DC converter that has high efficiency, high precision, fast transient response, a small start-up overshoot, over-current protection, and over-voltage protection so as to meet the requirements of a power source for modem microprocessors.

The invention has 5 digital inputs that can select up to 32 discrete output voltage levels. The circuit comprises a 5-bit DAC to covert the digital signal into an analog voltage level. The analog voltage is compared to the output voltage using an error amplifier. The output error level is inputted to a pulse-width modulator with a triangle waveform from a triangle waveform oscillator, which then outputs a PWM signal to a logical gate controller circuit. If the circuit is operating normally the PWM signal then drives the upper and lower output drivers. The drivers create non-overlapping synchronous that drive two power MOSFETs which act as switches to convert an inputted 5v level to a desired voltage level. The circuit provides a signal indicating if the output voltage is within +/−10% of an expected input voltage. The circuit includes over-current, and over-voltage protection as well as a soft-start circuit to control the rising of the output voltage.

These and other features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

DETAILED DESCRIPTION

In the following detailed description of the preferred embodiments, reference is made to the accompanying drawings which form a part hereof, and in which is shown by way of illustration specific preferred embodiments in which the invention may be practiced. The preferred embodiments are described in sufficient detail to enable these skilled in the art to practice the invention, and it is to be understood that other embodiments may be utilized and that logical, changes may be made without departing from the spirit and scope of the present invention. The following detailed description is, therefore, not to be taken in a limiting sense, and the scope of the present invention is defined only be the appended claims.

Figure 1:
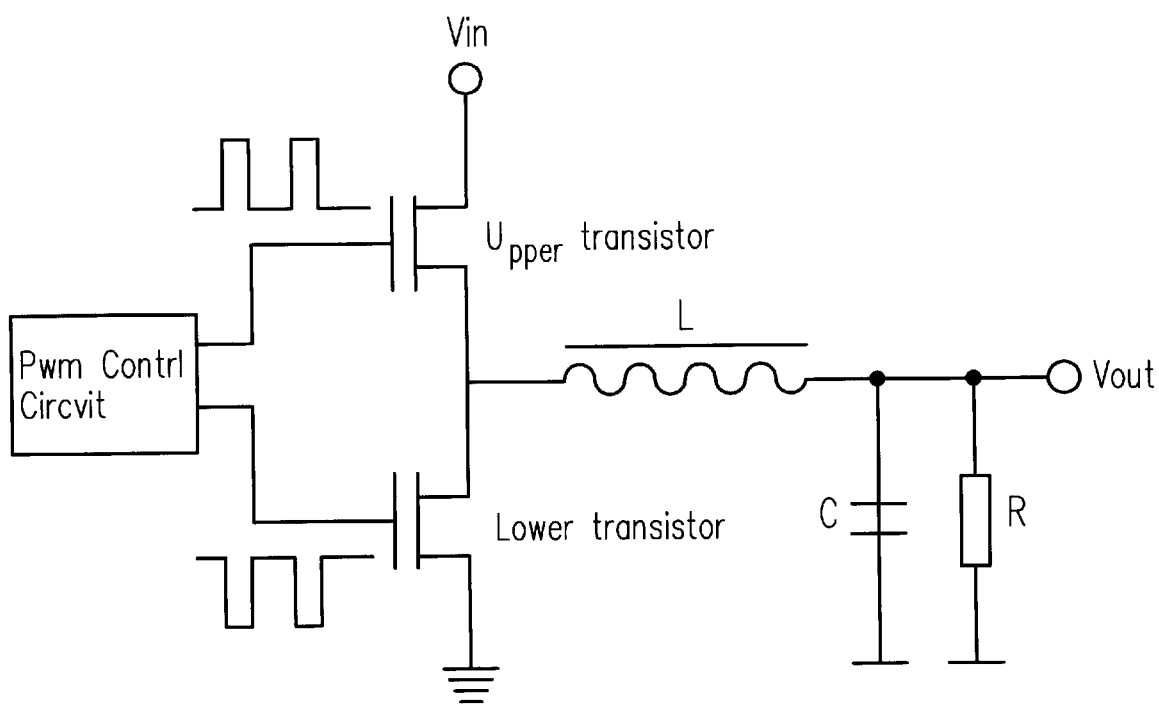
FIG. 1 is a synchronous rectification PWM circuit

FIG. 1 shows a preferred embodiment of the invention which is contained inside the dashed line. When the input voltages Vcc (12 v), and Vin (5 v) are above a given threshold, power on reset circuit outputs a startup signal, then the chip begins to operate. The soft start circuit 30 ensures that the start up voltage gradually increases. Five input signals (VID0–VID4), and a band gap reference voltage are inputted to a digital-to-analog converter 40 so that 32 discrete voltages can be programmed at $V_{DACOUT}$. The $V_{DACOUT}$ signal is inputted to an error amplifier A5. The difference between $V_{DACOUT}$ and the feedback of the actual output voltage is amplified by the error amplifier and outputted to the PWM comparator A6. The output voltage $V_{OUT}$ is fed back to FB pin through feedback compensation network, guaranteeing that VOUT is stable. A negative feedback network between FB pin and COMP pin, is used to compensate the error amplifier. At the PWM comparator the error signal is compared with a triangle waveform from the triangle waveform oscillator. After the comparison, a PWM signal is generated and inputted to the logical gate controller that acts to prevent the PWM signal from transferring to the upper and lower output drivers when an over-current or over-voltage situation occurs. In normal conditions the PWM signal passes on to the upper and lower output drivers, and a non-overlapping synchronous driving signal UGATE and LGATE is generated, which controls Q1 and Q2 respectively. These two non-overlapping signals will ensure that Q1 and Q2 will not open at the same time. Thus with the inductor L2 and output capacitor C6, a complete synchronous rectified buck switching regulator is constructed.

Figure 2:
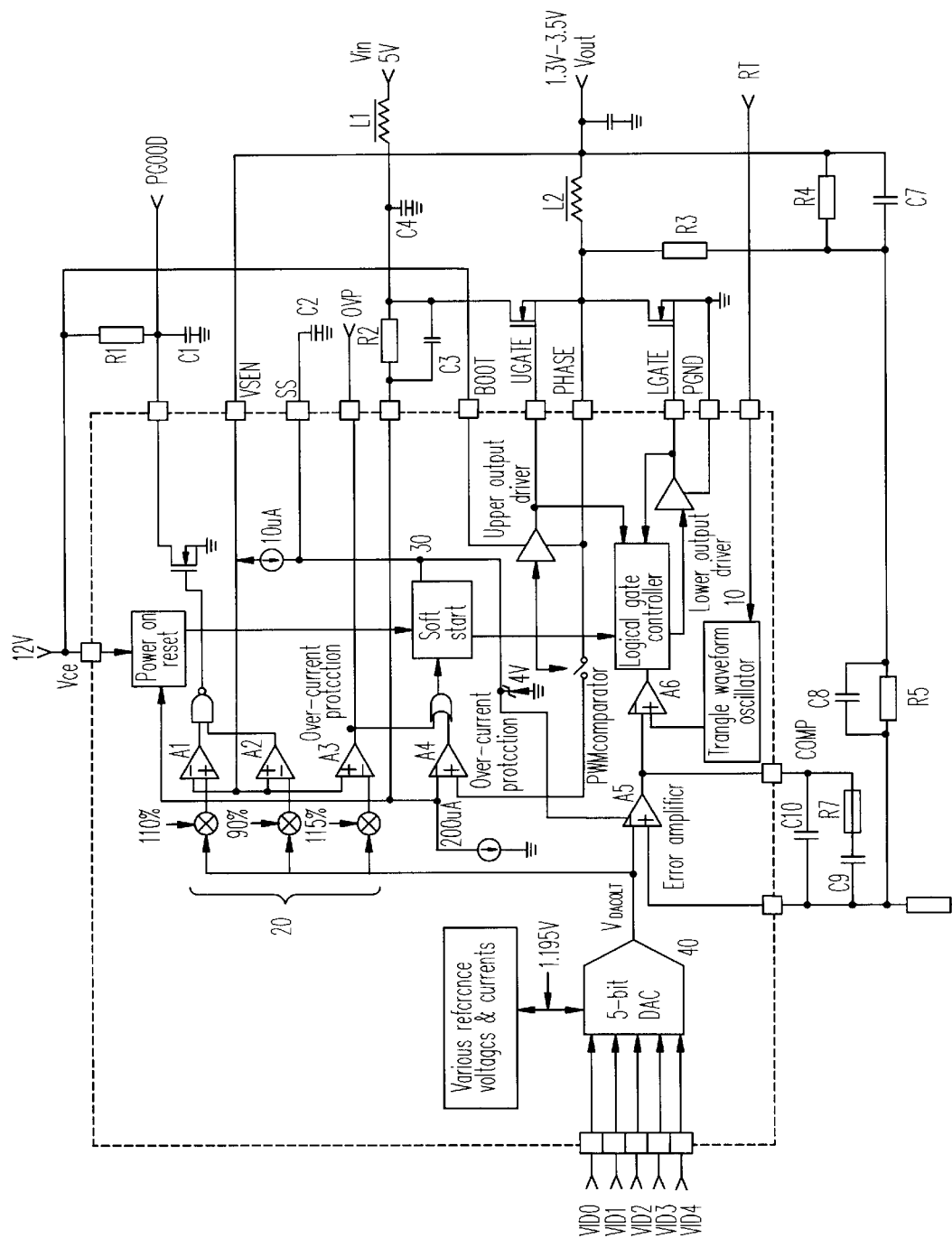
FIG. 2 is a schematic diagram of a switching voltage regulator according to a preferred embodiment of the invention.
Figure 3:
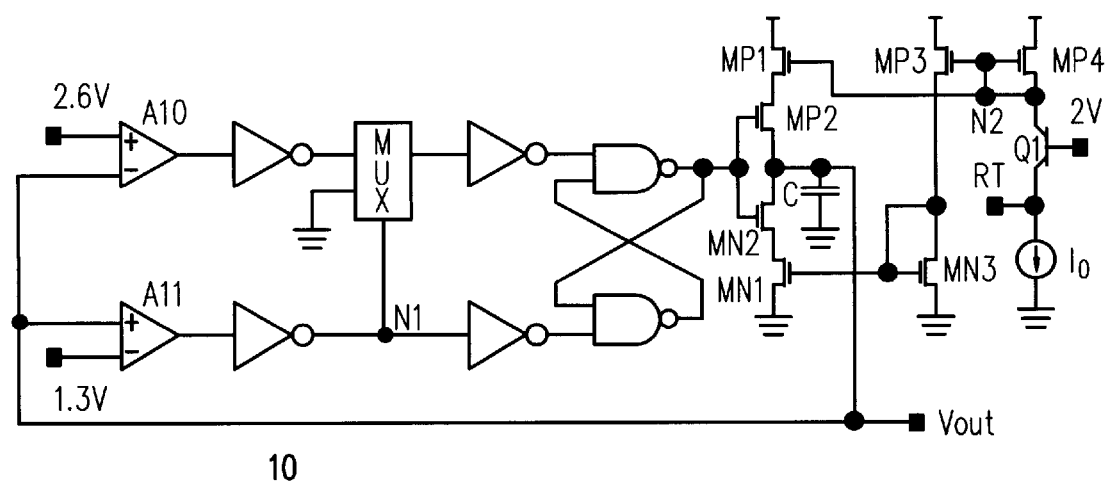
FIG. 3 is a schematic diagram of the triangle waveform oscillator of the invention

For a switching regulator, higher switching frequency can decrease the switching loss, so it is desirable that the frequency of switching regulator can be adjusted for different applications. In the triangle waveform oscillator 10 as shown in FIG. 2, the frequency of the triangle waveform can be adjusted by a resistor at RT input, so the output ripple and the MOSFET switching power dissipation can be compromised. FIG. 3 shows in greater detail the triangle waveform circuit 10 of the invention. The left side of the logic circuit controls the charging and discharging of capacitor C. Two voltages 2.6 v and 1.3 v are connected to an input of their respective comparators A10 and A11 which controls the highest and lowest voltage level of the triangle waveform, although someone skilled in the art will recognize that these comparators could be connected to a variety of input voltages. The comparator compares the inputted voltages with the output voltage $V_{OUT}$, and the output of comparator A10 is connected to an inverter and then inputted to a MUX. One output of the multiplexer is connected to the input of a second inverter and then inputted to a NAND gate, and the other output is connected to node N1. The output of comparator A11 is connected to an inverter with the signal outputting to node N1 and then to an input of another inverter before being inputted to a second NAND gate. The outputs of the NAND gates are connected to each others input, and to the gates of transistors MP2, and MN2. The right portion of the circuit comprises current mirrors guaranteeing that the charging and discharging currents equal, so that the output voltage is in isosceles triangle form. When a resistor is connected between RT and ground, the charging and discharging currents are increased, therefore also increasing the frequency. This relationship is shown by the following equation:

$$F_s = 200 \text{ kHz} + \frac{5.2 \times 10^6}{R_T \text{ (k}\Omega\text{)}}$$

When a resistor is connected between RT and 12 v, the charging and discharging currents are decreased, so the frequency is also decreased. This relationship is shown by the following equation:

$$F_s = 200 \text{ kHz} - \frac{4.28 \times 10^7}{R_T \text{ (k}\Omega\text{)}}$$

Figure 4:
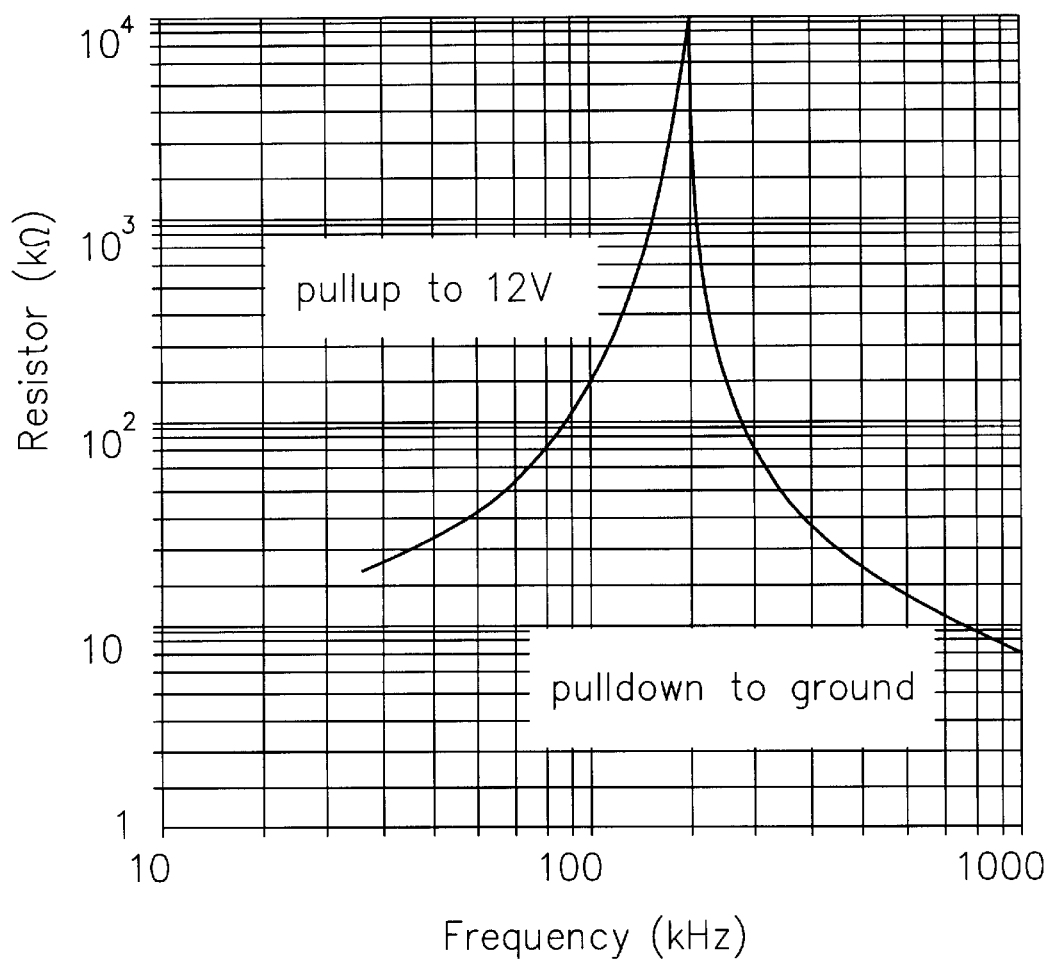
FIG. 4 is a graph showing the relationship of the resistance at RT to frequency in the triangle waveform oscillator.

This relationship between the adjusted frequency and the added resistor is further shown in FIG. 4. RT is connected to the emitter of Q1. The base of Q1 is connected to a 2 v supply voltage. The collector of Q1 is connected to node N2. Node N2 is connected to the drains of MP4, and the gates of MP4, MP3, and MP1. The sources of MP3, MP4, and MP1 are connected to Vcc. The drain of MP3 is connected to the drain of MN3, and the gates of MN3, and MN1. The drain of MN1 is connected to the source of MN2. The drains of MN2 and MP2 are connected to C and $V_{OUT}$. The drain of MP1 is connected to the source of MP2.

Figure 5:
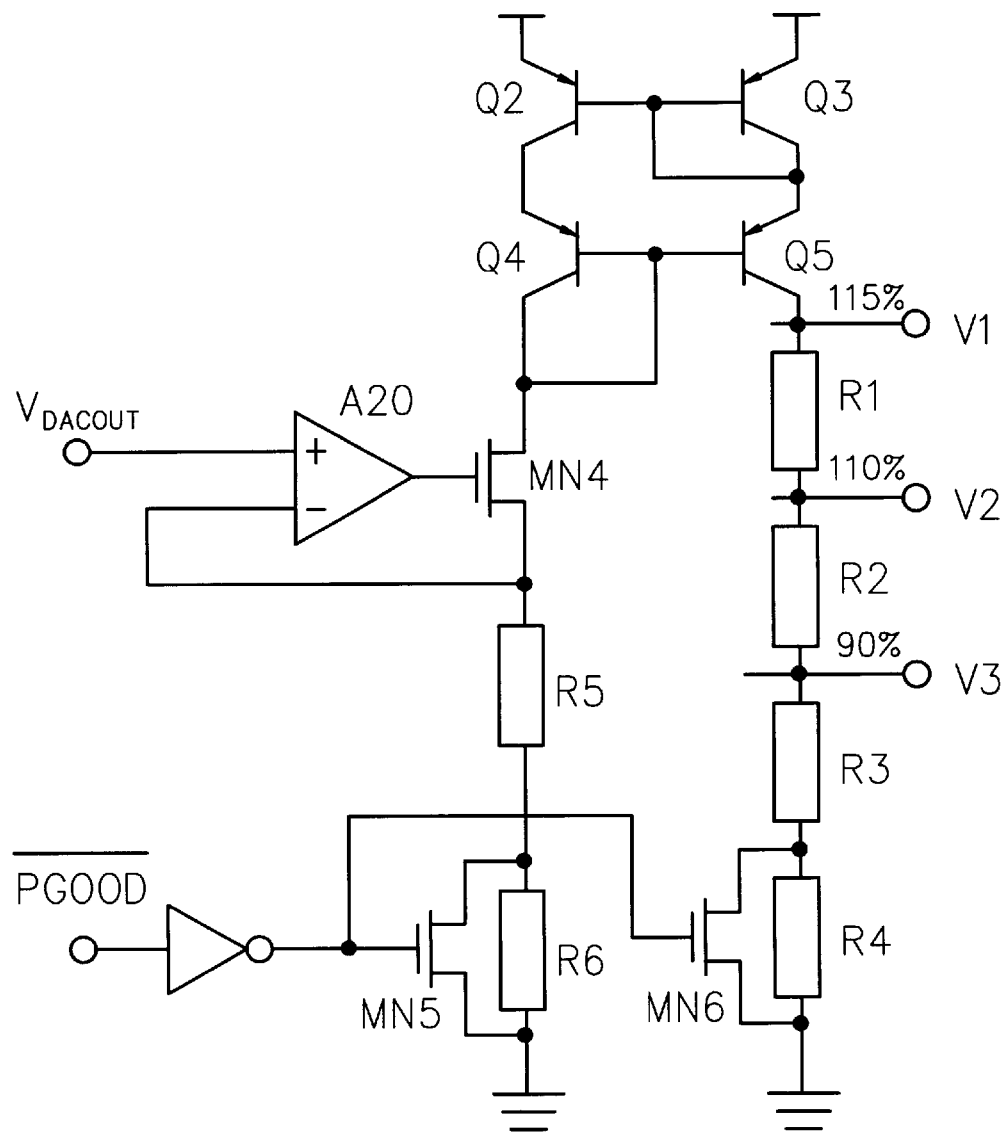
FIG. 5 is a schematic diagram of the input-output comparator of the invention.

FIG. 5 shows the input comparator circuit 20 of the invention. The desired input voltage $V_{DACOUT}$ is inputted from the DAC to comparator A20. Four transistors Q2, Q3, Q4, and Q5 form a current mirror at the top of the circuit with the emitters of Q2 and Q3 connected to Vcc. The collector and base of Q4 are connected to the drain of MN4. The comparator A20 compares the input voltage $V_{DACOUT}$ from the DAC, with a voltage at the drain of MN4. The output of comparator A20 is connected to the base of MN4. Connected between the source of MN4 and ground are two resistors R5 and R6. Between the collector of Q5 and ground are resistors R1–R4. A first voltage level is taken from the collector of Q5. A second voltage level is measured between resistors R1 and R2. A third voltage level is measured between R2 and R3. The three outputted voltages in one preferred embodiment of the invention correspond to 90%, 110%, and 115% of $V_{DACOUT}$ although the voltages could represent any percentage of the input voltage. The output voltage is inputted to comparators A1, A2, and A3 as shown in FIG. 1. In one preferred embodiment if the output voltage is below 110% of a required voltage as determined by comparator A1, and above 90% of a required voltage as determined by comparator A2, then the signal PGOOD is high. If the signal does not fall within this voltage range then signal PGOOD goes low. Signal PGOOD is connected to an inverter and then to the bases of MN5 and MN6. When signal PGOOD goes logical low resistors R6 and R4 of the input comparator circuit are shorted by their respective transistors therefore changing the values of V1, V2, and V3 accordingly.

If the voltage exceeds 115% of the desired output voltage (or the level of V1), the over-voltage circuit in the circuit non only turns on Q2 to decrease the output voltage, but also outputs a over-voltage signal at OVP pin to control other peripheral protection circuits. For over-current protection Q1's RDs(on) is used to monitor the ouput current and R2 is used to adjust the over-current threshold, so a current sensing resistor is not necessary.

Figure 6:
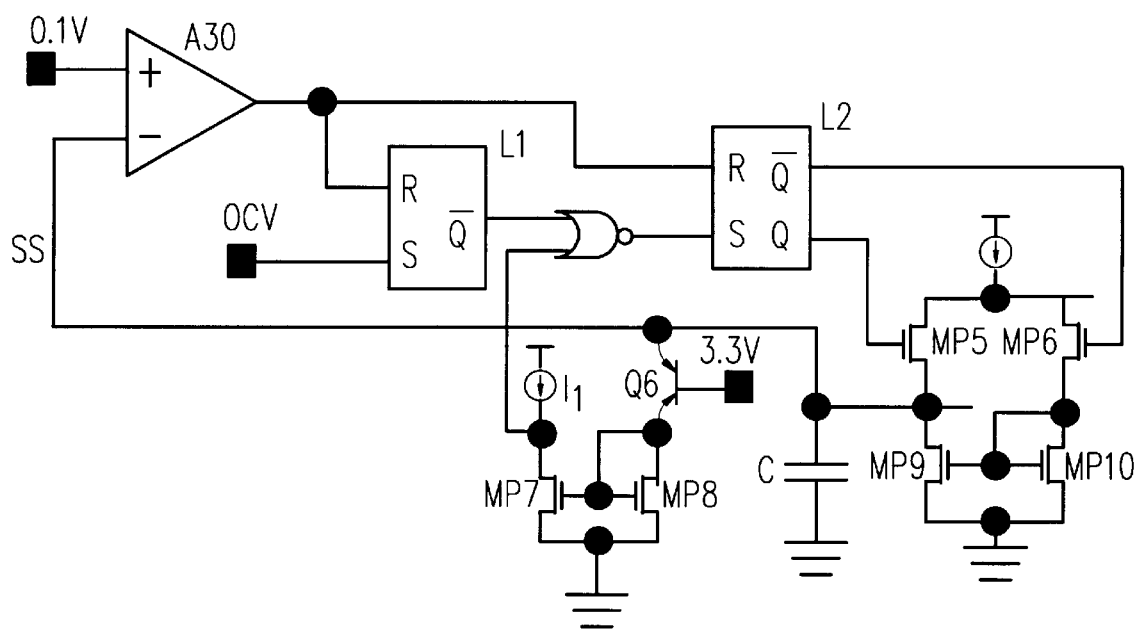
FIG. 6 is a schematic diagram of the soft-start circuit of the invention.

FIG. 6 shows the soft start circuit 30 of a preferred embodiment of the invention. The soft start circuit 30 provides the PWM regulator with a gradual increase in the start up voltage as to not overshoot the operating voltage upon startup. Operation of the circuit begins when the first comparator A30 determines that the voltage SS is below an input voltage shown as being 0.1 v however this input could have any level of voltage input. The output of comparator A30 is connected to R on latches L1 and L2. The output from L1 is connected to a NOR gate whose second input is connected to the drain of MN7. The output of the NOR gate is connected to S of L2. Output Q of L2 is connected to the base of MP5, while Q-not is connected to the base of MP6. The sources of MP5 and MP6 are connected to $I_o$. The drain of MP6 is connected to the drain of MN10, and the bases of MN10 and MN9. The sources of MN10 and MN9 are connected to ground. The drain of MN9 is connected to the drain of MP5 and the emitter of Q6. The base of Q6 is connected to a 3.3 v supply. The collector of Q6 is connected to the drain of MN8 and the bases of MN8 and MN7. The sources of MN8 and MN7 are connected to ground. The drain of MN7 is connected to $I_1$. The circuit also provides over-current, and over-voltage protection, provided from the inputs of the comparators A3 and A4 to the OCV input on a first latch L1 of the soft start circuit. If an over-current or over-voltage situation occurs the soft-start circuit as shown in FIG. 2 also outputs a signal to the logical gate control circuit. The output of the soft start circuit influences the level of the error amplifier.

Various additional modifications may be made to the illustrated embodiments without departing from the spirit and scope of the invention. Therefore, the invention lies in the claims hereinafter appended.

What is claimed is:

1. A Synchronous PWM Switching Regulator System comprising:

a DAC for converting a plurality of digital signals into an analog voltage that represents a desired output voltage;

a pulse width modulated circuit comprising an error amplifier, a PWM comparator, a triangle waveform oscillator, and a logical gate controller that creates synchronous non-overlapping signals;

a synchronous rectification circuit comprising an upper driver and a lower driver for creating signals to convert a first input voltage to a second desired voltage through the use of switches;

an input-comparator circuit for determining the relation of the level of an output voltage to that of a desired output voltage, wherein a signal is generated if the output voltage level falls within a determined range of a desired output voltage;

a soft start circuit for controlling the output voltage during start-up of the circuit;

an over-current protection circuit; and an over-voltage protection circuit.

2. The synchronous rectification circuit of claim 1, wherein the switch is a power metal-oxide-semiconductor field effect transistor (MOSFET).

3. The logical gate controller of claim 1, wherein the PWM signal is manipulated if an over-current or over-voltage condition exists.

4. The over-voltage protection circuit of claim 1, further comprising an outputted signal if an over-voltage condition occurs.

5. The triangle waveform oscillator of claim 1, further comprising a frequency adjusting means through an external input.

* * * * *